United States Patent [19]

Wirz

[11] 3,984,013
[45] Oct. 5, 1976

[54] ROLL-ON MECHANISM FOR LOADING A CONTAINER ONTO A VEHICLE

[76] Inventor: Herbert Wirz, Tramstrasse 124, 8707, Uetikon AM SEE, Switzerland

[22] Filed: Nov. 1, 1974

[21] Appl. No.: 519,996

[52] U.S. Cl............................ 214/38 C; 214/38 D; 214/515
[51] Int. Cl.² ........................................... B60P 1/64
[58] Field of Search ............... 214/38 C, 38 CA, 41, 214/302, 315–317, 515, 516, 77 R

[56] References Cited
UNITED STATES PATENTS

| | | | |
|---|---|---|---|
| 2,728,473 | 12/1955 | Pickard et al....................... | 214/315 |
| 3,214,044 | 10/1965 | Dempster et al. ............... | 214/516 X |
| 3,825,137 | 7/1974 | Mackrill et al................ | 214/77 R X |

*Primary Examiner*—Robert G. Sheridan
*Attorney, Agent, or Firm*—Irving M. Weiner; Pamela S. Burt

[57] ABSTRACT

A loading and unloading device for containers. In addition to the usual coupling means on the container there is provided an additional coupling means carried by a projecting support on the upper front part of the container. A roller and a stop are provided on one of the edges of a pit. The underside of the container is provided with a stop. A hook of a lifting arm of a lifting device on a vehicle is thus able to be coupled first with the usual coupling means and then with an additional coupling means. The device permits filling the container directly or emptying it directly, with no ramp being required.

9 Claims, 6 Drawing Figures

ROLL-ON MECHANISM FOR LOADING A CONTAINER ONTO A VEHICLE

The present invention relates to an apparatus for moving a container into and out of a pit. In particular, the present invention relates to an apparatus or a device for unloading a container from a self-loading motor vehicle into a pit, and loading the container onto said vehicle from such pit.

BACKGROUND OF THE INVENTION

Devices are known for unloading a container onto the ground from a self-loading motor vehicle, and loading the container onto the vehicle from a pit, wherein the container can be displaced by means of a lifting device coupled to the vehicle, via a rear roller on said vehicle. Thus, large containers can be loaded on and unloaded from the truck, tipped, and transported in a simple way.

These containers are quite suitable for transferring materials such as waste, rubbish, and the like. A container disposed on the ground is filled with material by vehicles having a smaller capacity. In order to make it possible to empty these vehicles into the container, when the latter is disposed on the ground, a guiding ramp is necessary, which reaches approximately the height of the upper edge of the container, so as to compensate for the from two to three meter difference in level. At the locations where there is no natural eminence, it is therefore necessary to install a special guiding ramp.

To avoid this, it would be advantageous for the container to be lowered by the vehicle to a level lower than the ground, for instance, into a pit; but this was impossible heretofore, owing to the lifting limitations of the lifting device.

An object of the invention is to obviate this drawback.

SUMMARY OF THE INVENTION

The present invention provides an apparatus for moving a container into and out of a pit. The container is provided with first coupling means and with second coupling means. At least a portion of the second coupling means is disposed higher than the first coupling means. The apparatus is used in combination with a pit in which the container may be disposed. The apparatus includes lifting means for selective removable attachment to the first coupling means and for selective removable attachment to at least a portion of the second coupling means to selectively move the container into and out of the pit.

The unloading of the container from a vehicle into a pit, and the loading of the container onto the vehicle from the pit are obtained according to the present invention by adding to the container for the coupling thereof to the lifting device, in addition to the coupling means normally used for laying down the container on the ground, an additional coupling means set higher. Also, a roller is provided on one of the edges of the pit, whereby the container can roll into the pit and roll out of the latter when said additional coupling means is coupled to the lifting device.

DETAILED DESCRIPTION

Figure 1:
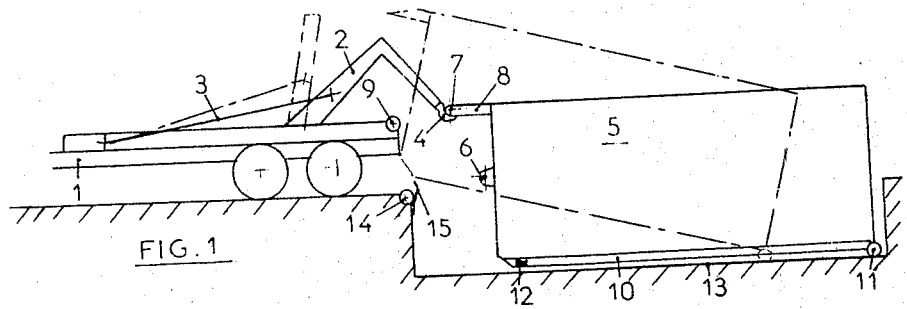
FIG. 1 is a side view of a vehicle or truck of the specified type, with a container lying in a pit.
Figure 2:
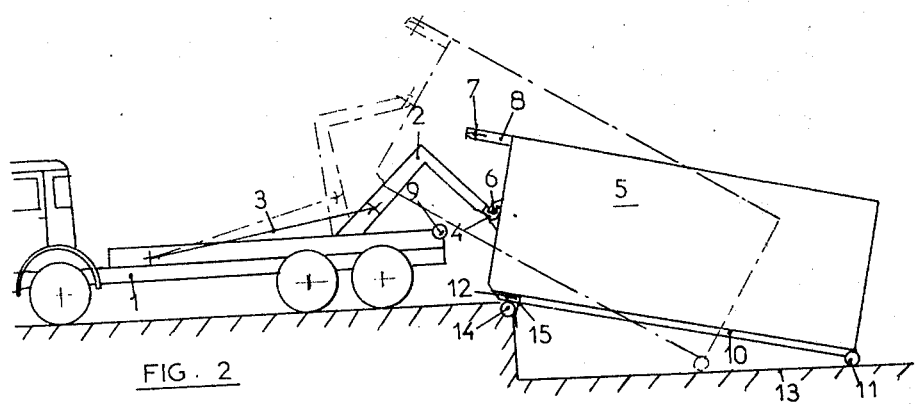
FIG. 2 is the same view, but with the container raised forwardly and bearing on the edge of the pit.
Figure 3:
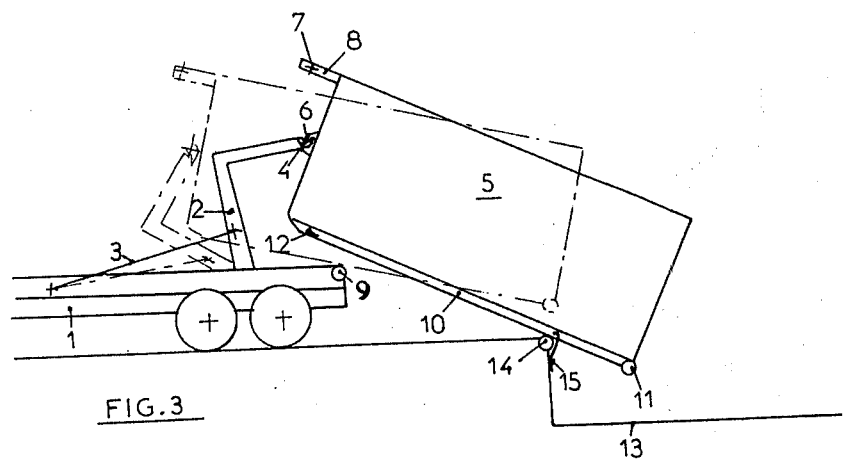
FIG. 3 is the same view, but with the container fully withdrawn from the pit.

In the embodiment shown in FIGS. 1 to 3, a vehicle 1 of the type specified has lifting means, including a lifting arm 2 which is adapted to pivot by means of a hydraulic lifting device 3, while its free end is provided with a hook 4. A container 5 is provided with first coupling means, such as a coupling piece in the shape of a bar 6, located about mid-way of the height of the front wall of said container 5, the hook 4 being adapted to be coupled to said bar 6 (FIGS. 2 and 3). A second coupling means, such as a coupling 7, which is located higher, is mounted on a support 8 which projects forwardly.

The vehicle 1 is provided with a rear roller 9, on which the container 5 is able to roll down by means of two longitudinal beams 10 on its underside. Moreover, the container 5 is provided at its rear edge with a roller 11, and at its front edge with a stop 12. A pit 13 intended to receive the container 5 is provided at one of its edges with a roller 14 and a stop 15.

When a container lies on the ground or the roadway, and not in a pit, it can therefore be loaded on the vehicle 1 in a simple way, by hooking the hook 4 of the lifting arm 2 to the coupling bar 6, and causing said arm 2 to pivot. The container 5 is first lifted in a forward direction, while its rear edge with the roller 11 remains on the ground, till the longitudinal beams 10 rest on the rear roller 9 of the vehicle. The container 5 is then drawn onto the vehicle 1, via the rear roller 9, by a further pivoting motion of the lifting arm 2. During this normal loading operation, said arm 2 describes an arc of a circle of about 135°. A greater arc of a circle, or a lower positioning of the hook 4 in its pivoted position, is impossible without affecting the lifting force adversely. A conventional container therefore cannot, at least until the advent of the present invention, be lowered lower than the ground, i.e., it cannot be unloaded into a pit and removed again from the latter, as would be desirable.

With the apparatus or device of FIGS. 1–3, on the contrary, this is possible by virtue of the provision of the additional coupling bar 7 on the container 5, and the roller 14 at the edge of the pit. To lift the container 5 out from the pit 13, the hook 4 of the lifting arm 2 is coupled to the coupling bar 7, and the arm 2 is made to pivot, so that said container 5 is lifted from the position shown in full lines in FIG. 1 to the position shown in dot-and-dash lines in said FIG. 1, while, by virtue of the coupling bar 7 being mounted on the forwardly projecting support 8, the lower edge of the container 5 is prevented from coming into contact with the lower part of the vehicle 1, as will be seen from FIG. 1.

In this raised position of the container 5, the front edge of the latter is prevented from skidding on the edge of the pit by the stops 12 and 15, so that it is then possible to uncouple the hook 4 from the bar 8, and couple it to the coupling bar 6, as shown in full lines in FIG. 2. The container 5 is then lifted again by means of the lifting arm 2, and, through a forward motion of the vehicle 1, it is pulled out from the pit through the agency of the roller 14 at the edge of said pit, and loaded onto the vehicle via the rear roller 9 of the latter, as shown in FIG. 3.

Figure 4:
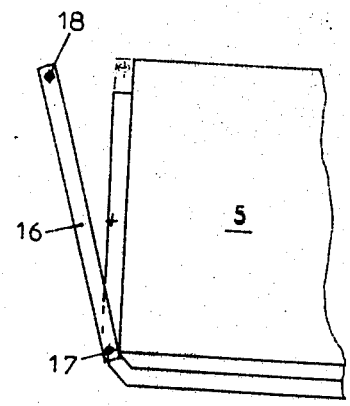
FIG. 4 is a partial side view of a modified embodiment of the container.
Figure 5:
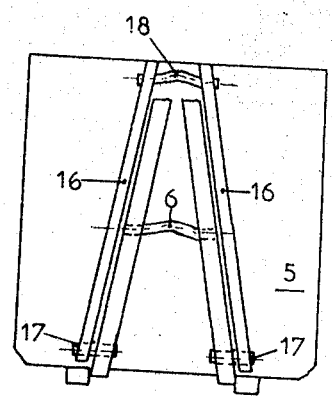
FIG. 5 is a front view of the container of FIG. 4.

In the modified embodiment of the container 5, as shown in FIGS. 4 and 5, a support arrangement 16, pivoted about a pivot 17, is mounted on the front side of the container 5, instead of the support 8 and the coupling bar 7. This pivotable support arrangement 16 is provided at its top with a coupling bar 18, which has the same function as the coupling bar 7.

Figure 6:
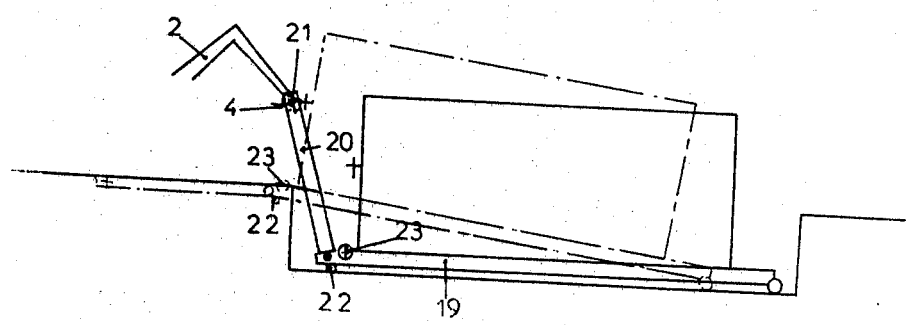
FIG. 6 is a side view of a further embodiment, showing a normal container and an additional frame.

FIG. 6 shows another modified embodiment, with which ordinary containers without any additional coupling bars can be used. Here, instead of said bars, an additional frame 19 is provided, which is used for picking up the container. This additional frame 19 is provided at its front part with a pivotable supporting structure 20 having the coupling bar 21, which is adapted to be coupled to the hook 4 of the vehicle 1, to be able to bring it on the edge of the pit 13. The additional frame 19 has in addition a rest projection 22 by means of which the container 5 can be laid on the edge of the pit 13 without slipping, as shown in dot-and-dash lines in FIG. 6. In this position, the coupling bar 6 of the container 5 can be coupled to the hook 4, and the container 5 can be loaded onto the vehicle 1. Here, a roller 23 is provided on the frame 19, instead of the roller 14 on the edge of the pit 13.

The lifting motion of the additional frame 19 by means of the lifting device of the vehicle 1, as just described, could also, of course, be effected independently from the vehicle 1, by means of a separate lifting gear.

I claim:

1. An apparatus for moving a container into and out of a pit, comprising, in combination:
   a container provided with first coupling means and with second coupling means;
   at least a portion of said second coupling means being disposed higher than said first coupling means;
   a pit in which said container may be disposed;
   lifting means for selective removable attachment to said first coupling means and for selective removable attachment to said portion of said second coupling means to selectively move said container into and out of said pit;
   a self-loading motor vehicle
   a rear roller provided on said vehicle; and
   a roller provided at one of the edges of said pit; and wherein
   said apparatus unloads said container from said self-loading motor vehicle into said pit, and loads said container onto said vehicle from said pit;
   said lifting means comprises a lifting device disposed on said vehicle;
   said container being displaceable on said rear roller of said vehicle by means of said lifting device;
   said first coupling means comprises the normal coupling means used for laying down said container on the ground;
   said second coupling means comprises an additional coupling means which is added to and set higher on said container than said normal coupling means for coupling to said lifting device; and
   when said additional coupling means is coupled to said lifting device, said container may roll on said roller provided at the edge of said pit to roll down into said pit and to roll out from said pit.

2. An apparatus according to claim 1, including:
   a support projecting from the front wall of said container; and
   said additional coupling means is located on said support projecting from the front wall of said container.

3. An apparatus according to claim 1, including:
   a supporting arm pivotally mounted on the front wall of said container so that said supporting arm may pivot from the front wall of said container in a forward direction; and
   said additional coupling means is mounted on said supporting arm.

4. An apparatus according to claim 1, including:
   stops provided on the front part of the underside of said container and on said edge of said pit which is provided with said roller, respectively, to support said container when selectively changing the coupling arrangement.

5. An apparatus for moving a container into and out of a pit, comprising, in combination:
   a container provided with first coupling means and with second coupling means;
   at least a portion of said second coupling means being disposed higher than said first coupling means;
   a pit in which said container may be disposed;
   lifting means for selective removable attachment to said first coupling means and for selective removable attachment to said portion of said second coupling means to selectively move said container into and out of said pit;
   a self-loading motor vehicle;
   a rear roller provided on said vehicle; and
   a roller provided at one of the edges of said pit; and wherein
   said apparatus unloads said container from said self-loading motor vehicle into said pit, and loads said container onto said vehicle from said pit;
   said lifting means comprises a lifting device disposed on said vehicle;
   said container being displaceable on said rear roller of said vehicle by means of said lifting device;
   said first coupling means comprises the normal coupling means used for laying down said container on the ground;
   said second coupling means comprises an additional coupling means which is added to and set higher on said container than said normal coupling means for coupling to said lifting device;
   when said additional coupling means is coupled to said lifting device, said container may roll on said roller provided at the edge of said pit to roll down into said pit and to roll out from said pit; and
   an additional frame for receiving said container, wherein said additional frame may be lowered into said pit and lifted out from said pit up to the edge of said pit.

6. An apparatus according to claim 5, wherein:
   said additional frame carries said additional coupling means for coupling to said lifting device of said vehicle.

7. An apparatus according to claim 5, wherein said additional frame may be lifted in said pit by means of a separate lifting device.

8. An apparatus according to claim 5, including:

rollers and rest projections provided on the front edge of said additional frame.

9. An apparatus according to claim 1, including:
roller means provided on a portion of said container which is remote from said edge of said pit; whereby said container may roll on said roller means to roll down into said pit and to roll out from said pit.

* * * * *